(12) United States Patent
Dalla Palma et al.

(10) Patent No.: US 12,258,021 B2
(45) Date of Patent: Mar. 25, 2025

(54) HYDROMECHANICAL TRANSMISSION AND CONTROL METHOD

(71) Applicant: DANA ITALIA S.R.L., Trentino (IT)

(72) Inventors: Lorenzo Dalla Palma, Arco (IT); Mario Gelmini, Arco (IT); Claudio Angeloni, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 18/339,552

(22) Filed: Jun. 22, 2023

(65) Prior Publication Data

US 2023/0331233 A1 Oct. 19, 2023

Related U.S. Application Data

(63) Continuation of application No. 17/448,323, filed on Sep. 21, 2021, now Pat. No. 11,731,634.

(51) Int. Cl.
| | |
|---|---|
| *B60W 50/00* | (2006.01) |
| *B60K 17/10* | (2006.01) |
| *B60W 10/02* | (2006.01) |
| *B60W 10/103* | (2012.01) |
| *B60W 30/18* | (2012.01) |

(Continued)

(52) U.S. Cl.
CPC ........... *B60W 30/188* (2013.01); *B60K 17/10* (2013.01); *B60W 10/02* (2013.01); *B60W 10/103* (2013.01); *B60W 30/18172* (2013.01); *B60W 40/10* (2013.01); *B60W 50/06* (2013.01); *F16H 47/04* (2013.01); *F16H 61/433* (2013.01); *F16H 61/47* (2013.01); *F16H 61/472* (2013.01);
(Continued)

(58) Field of Classification Search
CPC .. B60W 30/188; B60W 10/02; B60W 10/103; B60W 30/18172; B60W 40/10; B60W 50/06; B60W 2510/0638; B60W 2050/0012; F16H 47/04; F16H 61/433; F16H 61/47; F16H 61/472
See application file for complete search history.

(56) References Cited

U.S. PATENT DOCUMENTS

| | | |
|---|---|---|
| 5,406,793 A | 4/1995 | Maruyama et al. |
| 5,540,051 A | 7/1996 | Maruyama et al. |

(Continued)

FOREIGN PATENT DOCUMENTS

| | | | | |
|---|---|---|---|---|
| CN | 106354975 A | * | 1/2017 | ......... G06F 17/5018 |
| DE | 102012221943 A1 | | 6/2014 | |

*Primary Examiner* — Tinh Dang
(74) *Attorney, Agent, or Firm* — McCoy Russell LLP

(57) ABSTRACT

Methods and systems for controlling a hydromechanical transmission are proposed. In one example, a control method for a hydrostatic unit of a hydromechanical variable transmission (HVT) is presented, comprising controlling the hydrostatic unit via a feedforward control architecture including a non-linear, multi-coefficient model, wherein the hydrostatic unit comprises a hydrostatic pump and a hydrostatic motor and a desired differential pressure of the hydrostatic unit or a desired hydraulic pump displacement may be used as inputs for the model, where the model's output is a pressure difference for a pump control piston coupled to a swash plate of the hydrostatic unit. Use of the non-linear model permits the hydrostatic unit to be controlled based on load, speed, and/or torque, thereby increasing the adaptability of the control system.

12 Claims, 7 Drawing Sheets

(51) Int. Cl.
*B60W 30/188* (2012.01)
*B60W 40/10* (2012.01)
*B60W 50/06* (2006.01)
*F16H 47/04* (2006.01)
*F16H 61/4008* (2010.01)
*F16H 61/433* (2010.01)
*F16H 61/47* (2010.01)
*F16H 61/472* (2010.01)

(52) U.S. Cl.
CPC ............... *B60W 2050/0012* (2013.01); *B60W 2510/0638* (2013.01)

(56) References Cited

U.S. PATENT DOCUMENTS

| | | | |
|---|---|---|---|
| 5,671,137 | A | 9/1997 | Ishino et al. |
| 5,684,694 | A | 11/1997 | Ishino et al. |
| 8,000,863 | B2 | 8/2011 | DeMarco et al. |
| 8,473,170 | B2 | 6/2013 | Stoller et al. |
| 8,762,014 | B2 | 6/2014 | Lister et al. |
| 9,097,337 | B2 | 8/2015 | Sah et al. |
| 9,140,337 | B2 | 9/2015 | Sah et al. |
| 9,550,490 | B2 | 1/2017 | Guo et al. |
| 2011/0295473 | A1 | 12/2011 | DeMarco et al. |
| 2016/0153165 | A1* | 6/2016 | Singh ............ E02F 3/433 701/50 |
| 2021/0010430 | A1* | 1/2021 | De Wergifosse ......... F02C 7/32 |

\* cited by examiner

HYDROMECHANICAL TRANSMISSION AND CONTROL METHOD

CROSS REFERENCE TO RELATED APPLICATION

The present application is a continuation of U.S. Non-Provisional patent application Ser. No. 17/448,323, entitled "HYDROMECHANICAL TRANSMISSION AND CONTROL METHOD", and filed on Sep. 21, 2021. The entire contents of the above-listed application are hereby incorporated by reference for all purposes.

TECHNICAL FIELD

The present disclosure relates generally to a hydromechanical transmission, and more specifically, to a feedforward control strategy for the hydromechanical transmission.

BACKGROUND AND SUMMARY

Hydromechanical transmissions enable performance characteristics (e.g., efficiency, shift quality, drive characteristics, control response, and the like) from mechanical and hydrostatic transmissions to be blended to meet certain design objectives. Certain hydromechanical transmissions, referred to in the art as hydromechanical variable transmissions (HVTs), provide continuously variable gear ratios. Hydromechanical transmissions may be particularly desirable due to their efficiency. Vehicles used in industries such as agriculture, construction, mining, material handling, oil and gas, and the like have therefore made use of HVTs.

Prior HVTs have included a hydrostatic unit with a hydrostatic pump and motor. In some designs the hydrostatic pump is a variable displacement pump. In this design, a displacement of the pump depends on an angle of a swash plate of the hydrostatic unit, which may be adjusted by a controller. Specifically, the controller may adjust a position of a double-action pump control piston to control the angle of the swash plate, via a pressure of the hydraulic fluid.

In certain prior HVT control strategies, the controller directly controls the position of a pump control piston via a hydraulic valve within a mechanical feedback control loop. In this system, the differential pressure of the pump does not affect the control piston behavior, because the load effect is automatically compensated by the hydraulic valve with the mechanical feedback. In this solution the control of pump displacement is simple and straightforward, but the differential pressure is not directly controllable.

In other prior HVT control strategies, the controller directly controls a pressure of the hydraulic fluid on the control piston chambers, providing a complex and non-linear characteristic between the pressure on the control piston, the hydrostatic differential pressure, pump displacement, and pump speed. This solution is more flexible, but the identification and usage of the non-linear characteristic is complex and has been oversimplified, with a consequent inaccuracy.

Further in prior control strategies, the hydrostatic pump and motor that may be controlled in a speed control mode, where the pump displacement is controlled based on a desired speed of the hydrostatic motor, or a torque control mode, where the pump displacement is controlled based on a desired torque of the hydrostatic motor. However, previous control strategies for transmission hydrostatic control units have been unable to address both the torque and speed control modes and efficiently switch between them, which may reduce transmission efficiency and/or constrain transmission performance (e.g., a control lag may cause instability and/or oscillation, over-control may cause control ringing or under-damped oscillation, etc.). For example, in U.S. Pat. No. 8,762,014 B2, Lister et al teaches a strategy for controlling the hydrostatic unit solely in a torque control mode. Further, in the approach taken by Lister, the hydrostatic transmission control strategy oversimplifies transmission kinematics, which may result in control inaccuracies.

In one embodiment, at least a portion of the abovementioned issues may be addressed by a control method for a hydrostatic unit of a hydromechanical variable transmission (HVT), comprising controlling the hydrostatic unit via a feedforward control architecture including a non-linear, multi-coefficient model, wherein the hydrostatic unit comprises a hydrostatic pump and a hydrostatic motor. In some cases, the coefficients of the multi-coefficient model may be calibrated using an automatic calibration procedure at a late stage in manufacturing of the transmission and/or at predetermined operating intervals. A desired differential pressure of the hydrostatic unit or a desired hydraulic pump displacement may be used as inputs for the model, where the model's output is a pressure difference for a pump control piston coupled to a swash plate of the hydrostatic unit. Using a non-linear model for feedforward hydrostatic unit control in this manner enables the hydrostatic unit to be both efficiently and accurately controlled. Use of the non-linear model further permits the hydrostatic unit to be controlled based on load, speed, and/or torque, thereby increasing the adaptability of the control system.

In another example, the method may further include switching between a torque control mode and a speed control mode of a hydrostatic unit based on vehicle operating conditions; wherein the multi-coefficient model is used to determine feedforward outputs in both the speed and torque control modes. In the torque control mode, a desired differential pressure may be used as an input for the multi-coefficient model while in the speed control mode, a desired hydraulic pump displacement may be used as an input for the model. Thus, the benefits of both using mechanical feedback control loop and controlling a pressure of the hydraulic fluid may be achieved, where the hydrostatic differential pressure may be controlled by compensating the pump displacement, or the pump displacement may be controlled by compensating the hydrostatic differential pressure. In this way, a common model may be used in both the speed and torque control modes by strategically varying the model's inputs in the different modes. Consequently, the control system can rapidly switch between the modes depending on vehicle operating conditions which may reduce control latency and more generally enhance transmission performance. Further, using a common model in both the speed and torque control modes enables processing resources in the system to be conserved, thereby increasing controls system efficiency.

In yet another example, the control system may use junction filters for the inputs of the non-linear model to ensure continuity when switching between the torque and speed control modes.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the

DETAILED DESCRIPTION

Figure 1:
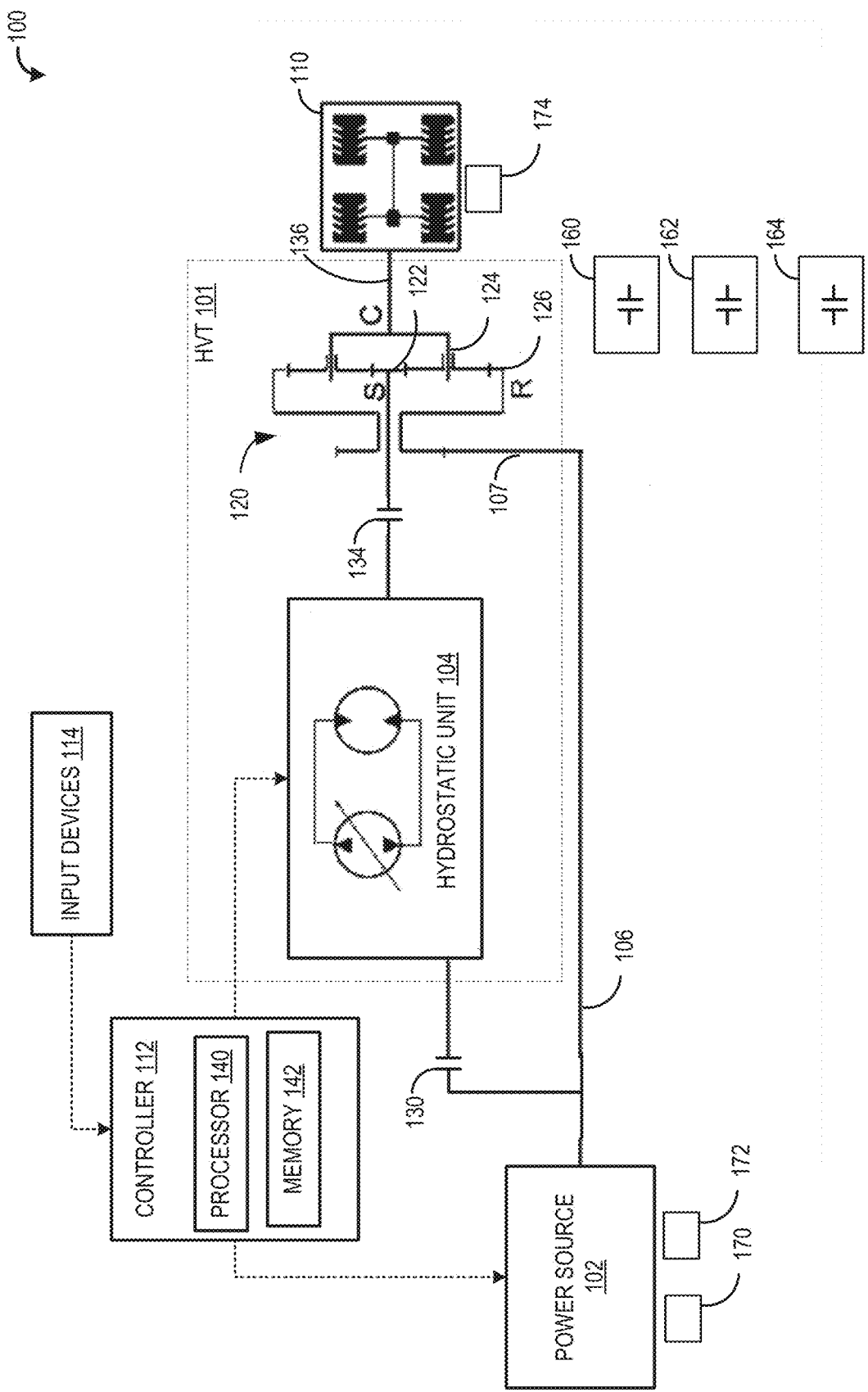
FIG. 1 is a schematic representation of a hydromechanical variable transmission and control system.

The methods described herein refer to a control strategy for controlling operation of a hydromechanical variable transmission (HVT) via a feedforward control architecture including a non-linear, multi-coefficient model. An HVT of a vehicle may include a hydrostatic unit with a variable displacement hydrostatic (e.g., hydraulic) pump and motor, used in combination with mechanical gearing in a transmission powered by an engine. Specifically, the hydrostatic unit may be controlled in two different modes, between which the hydrostatic unit may switch during operation of the vehicle. In a speed control mode, the pump displacement variable is controlled based on a desired speed of the hydrostatic motor (e.g., where a torque of the hydrostatic motor is not controlled). For example, when one or more gears of the HVT are disengaged, the hydrostatic unit may be speed controlled at a first engagement of the HVT to synchronize a desired clutch (e.g., a first forward clutch or a backward clutch, depending on a forward-neutral-reverse (FNR) lever), or during a "blocking function", where the one or more gears of the of the HVT are engaged to maintain the vehicle at a standstill and memorize a load of the vehicle before a second blocking clutch engagement, or during a "freewheel" state, to follow a free output speed and be ready to re-engage an appropriate clutch quickly. In a torque control mode, a pump displacement variable is controlled based on a desired torque of the hydrostatic motor (e.g., where a speed of the hydrostatic motor is not controlled). For example, the hydrostatic unit may be torque controlled when the one or more gears of the HVT are engaged to deliver an output torque (e.g., vehicle tractive effort) to the one or more wheels of the vehicle based on operator input (e.g., pedals, FNR, etc.).

The controller of the vehicle may switch between the torque and speed control modes by adjusting a position of a pump control piston coupled to a swash plate of the hydrostatic unit via a cam joint. In one example, a load applied to the wheels of the vehicle is converted into a load on the hydrostatic motor, generating a pressure that may be delivered to the pump control piston via a hydraulic fluid. The pressure on the pump control piston may be directed to a first end of the pump control piston via a first pump piston valve, or to a second, opposite end of the pump piston via a second pump piston valve. The first pump piston valve and the second pump piston valve may be actuated concurrently. The first pump piston valve is actuated to apply a first pressure to the pump control piston in a first direction, and the second pump piston valve is actuated to apply a second pressure to the pump control piston a second direction, within a cylinder of the pump control piston, where the position of the pump control piston is determined by a pressure differential between the first pressure and the second pressure. One or more control strategies may be used to actuate the first pump piston valve and the second pump piston valve to adjust the pump control piston to a desired position. When the pump control piston is at the desired position, an angle of the swash plate is at a desired angle. Since the angle of the swash plate controls a displacement of the variable displacement pump, the displacement may be controlled by controlling an actuation of the first pump piston valve and the second pump piston valve.

To increase a performance of the HVT, reduce wear on parts of the HVT, and reduce a discontinuity when switching between the torque and speed control modes, a control strategy comprising a feedforward control architecture is proposed, based on a polynomial non-linear model for a hydrostatic unit of the HVT. FIG. 1 shows an example HVT control system configured with a hydrostatic unit, such as the example hydrostatic unit of FIG. 2. The hydrostatic unit may include a hydrostatic pump and motor, where a pump displacement is controlled by a pump control piston. A motion of the pump control piston may be determined by forces and/or pressures on the pump control piston and a corresponding swash plate, such as the forces illustrated in the force diagrams of FIGS. 3A, 3B, and 3C. During the torque control mode, the HVT may be controlled using a feedforward control architecture based on the polynomial non-linear model in a first configuration, such as the configuration shown by FIG. 4A, and during the speed control mode, the HVT may be controlled using a feedforward control loop based on the same polynomial non-linear model in a second configuration, such as the configuration shown by FIG. 4B, where the first configuration of the polynomial non-linear model and the second configuration of the polynomial non-linear model share the same parameters and coefficients. The coefficients of the polynomial non-linear model used in both configurations may be estimated via an automatic calibration procedure, such as the calibration procedure described in method 500 of FIG. 5. The automatic calibration procedure may solve for the coefficients sequentially by eliminating terms of the polynomial non-linear model, as shown graphically in FIG. 6.

Referring now to FIG. 1, a schematic depiction of an HVT control system 100 of a vehicle is shown, including an HVT 101 mechanically coupled to a power source 102 and one or more wheels 110 of the vehicle. The power source 104 may include an internal combustion engine, electric motor (e.g., electric motor-generator), combinations thereof, and the like. It should be appreciated that while FIG. 1 refers to an embodiment within a vehicle, in other embodiments the HVT control system 100 may not be included in a vehicle, and may be included in a different machine that generates torque for a purpose other than propulsion.

The HVT 101 comprises a hydrostatic unit 104, which may be rotationally coupled to a planetary gear set 120. For example, a ring gear 126 of the planetary gear set 120 may be rotationally coupled to the power source 102 via a mechanical path 106 (e.g., a crankshaft), a sun gear 122 of the planetary gear set may be rotationally coupled to the hydrostatic unit 104, and a carrier 124 of the planetary gear set 120 may be rotationally coupled to the one or more wheels 110 of the vehicle. During operation of the vehicle, the ring gear 126 is rotated by the engine 102 at an engine speed, and a rotation of the sun gear 122 is adjusted by the hydrostatic unit 104. By adjusting the rotation of the sun gear 122 with respect to the ring gear 126, a variable amount of torque may be generated via the carrier 124, which is transmitted to one or more wheels 110 of the vehicle. Thus, the engine speed may be held at a constant, efficient engine speed while the torque generated by the HVT 101 is increased or decreased by controlling the hydrostatic unit 104. A system output shaft 136 may be coupled to a driveline with a shaft, joints, etc. that may be used to carry out the power transfer between the HVT 101 and one or more axles on which the one or more wheels 110 are coupled.

The HVT control system 100 may include various clutches. A power source disconnect clutch 130 may be arranged between the power source 102 and the hydrostatic unit 104, to couple and decouple the power source 102 from the hydrostatic unit 104. Similarly, a disconnect clutch 134 may be arranged between the hydrostatic unit 104 and the planetary gear set 120, to couple and decouple the hydrostatic unit 104 from the planetary gear set 120. The disconnect clutches 130 and 134 may be dog clutches, or friction clutches, or another kind of clutch.

The planetary gear set 120 further includes a reverse drive clutch 160, a first forward drive clutch 162, and a second forward drive clutch 164. More generally, the first forward drive clutch 162 may be referred to as a first clutch or a first forward clutch, the reverse drive clutch 160 may be referred to as a second clutch or a reverse clutch, and the second forward drive clutch 164 may be referred to as a third clutch or a second forward clutch.

Further in one example, the first forward drive clutch 162 and the reverse drive clutch 160 may be arranged adjacent to one another and have axes of rotation that are coaxial. Specifically, in one example, the first forward drive clutch 162 and the reverse drive clutch 160 may each receive rotational input from the carrier 124 of the planetary gear set 120. When engaged, the first forward drive clutch 162 causes the transmission's output to rotate in a forward drive direction. Conversely, when engaged, the reverse drive clutch 160 causes the transmission's output to rotate in a reverse drive direction that is opposite the forward drive direction. As such, during certain conditions, the first forward drive clutch 162 and the reverse drive clutch 160 may be simultaneously engaged to place the transmission's output in a blocked condition in which it is held substantially stationary.

The disconnect clutches 130 and 134 and/or the drive clutches 160, 162, and 164 may be friction clutches that each include two sets of clutch plates. The clutch plates may rotate about a common axis and may be designed to engage and disengage one another to facilitate selective power transfer to downstream components. In this way, the clutches may be closed and opened to place them in engaged and disengaged states. In the disengaged state, power does not pass through the clutch. Conversely in the engaged state, power travels through the clutch during transmission operation. Further, the clutches may be hydraulically, electromagnetically, and/or pneumatically actuated. For instance, the clutches may be adjusted via a hydraulic piston. The adjustability may be continuous, in one example, where the clutch may be transition through partially engaged states to a fully engaged state, where a relatively small amount of power loss occurs in the clutch. However, in other examples, the clutches may be discretely adjusted.

The hydrostatic unit 104 may be controlled by a controller 112 of the vehicle. The controller 112 may include a processor 140 and memory 142. The memory 142 may hold instructions stored therein that when executed by the processor cause the controller 112 to perform the various methods, control strategies, diagnostic techniques, etc., described herein. The processor 140 may include a microprocessor unit and/or other types of circuits. The memory 142 may include known data storage mediums such as random access memory, read only memory, keep alive memory, combinations thereof, etc. The memory 142 may include non-transitory memory.

The controller 112 may receive vehicle data and various signals from sensors positioned in different locations in the HVT 101 and/or the vehicle. The sensors may include an oil temperature sensor 170, an engine velocity sensor 172, one or more wheel velocity sensors 174, and/or other sensors of the hydrostatic unit (e.g., torque sensors, pressure sensors, swash plate angle sensor, etc.). The controller 112 may send control signals to one or more actuators of the hydrostatic unit 104, for example, to adjust an output and/or direction of a flow of hydraulic fluid through a hydrostatic pump, as described in further detail below in reference to FIG. 2 and FIGS. 3A, 3B, and 3C. Additionally, the clutches 130 and 134 may receive commands (e.g., opening or closing commands) from the controller, and actuators in the clutches 130 and 134 or actuation systems coupled to the clutches 130 and 134 may adjust the state of the clutches 130 and 134 in response to receiving the commands. For instance, the clutches 130 and 134 may be actuated via hydraulically controlled pistons, or a different suitable clutch actuator.

The HVT control system 100 may include one or more input devices 114. For example, the input devices 114 may include a pedal of the vehicle (e.g., an accelerator pedal), a control stick (e.g., a forward-neutral-reverse (FNR) lever), one or more buttons, or similar types of control, or combinations thereof. In one example, a FNR lever is used to operate the vehicle in a forward direction or a reverse direction, and an accelerator pedal is used to increase or decrease a speed of the vehicle. The input devices 114, responsive to driver input, may generate a transmission speed adjustment request or torque adjustment request and a desired drive direction (a forward or reverse drive direction).

The HVT control system 100 may automatically switch between drive modes when demanded. For example, the operator may request a forward or reverse drive mode speed change, and the HVT 101 may increase speed and automatically transition between one or more drive ranges associated with the different drive modes, as needed. The operate may request reverse drive operation while the vehicle is operating in a forward drive mode. In such an example, the HVT 101 may automatically initiate a shift (e.g., synchronous shift) between the forward and reverse drive modes. In this way, the operator may more efficiently control the vehicle, in comparison to transmissions designed for manual drive mode adjustment. It will further be appreciated that the power source 102 may be controlled in tandem with the HVT 101. For instance, when a speed adjustment requested is received by the controller, an output speed of the power source 102 may be correspondingly increased.

The HVT 101 may function as an infinitely variable transmission (IVT) where the transmission's gear ratio is controlled continuously from a negative maximum speed to a positive maximum speed with an infinite number of ratio points. In this way, the transmission can achieve a comparatively high level of adaptability and efficiency when compared to transmission which operate in discrete ratios.

Figure 2:
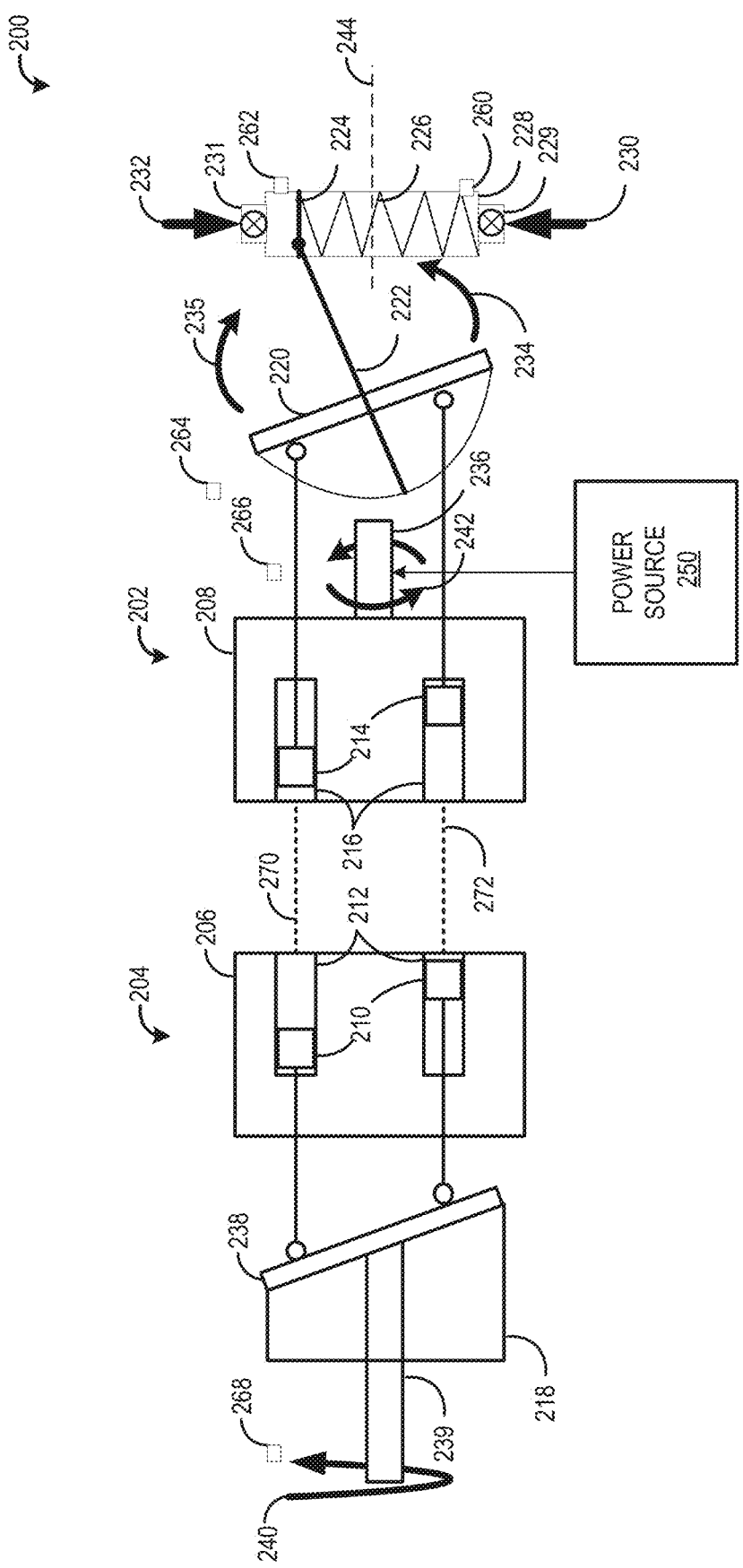
FIG. 2 is a schematic representation of a hydrostatic unit of a hydromechanical variable transmission.

Referring now to FIG. 2, a detailed schematic drawing of a hydrostatic unit 200 of a vehicle is shown, which may be a non-limiting example of the hydrostatic unit 104 described above in reference to FIG. 1. The hydrostatic unit functions as a variator that provides a variable output torque based on an applied control differential pressure, via a hydrostatic pump 202 and a hydrostatic motor 204. The hydrostatic pump 202 includes a number of pistons 214 that slide within an equal number of respective chambers 216 of a pump carrier 208, where the pump carrier 208 is rotated via a pump input shaft 236 coupled to a power source 250 (e.g., an engine of the vehicle, an electric motor, etc.). The equal number of respective chambers ride on a variable angle swash plate 220 via sliding contacts, such that the range of movement of the pistons 214 is set by an angle of the swash plate 220.

The hydrostatic motor 204 comprises a similar arrangement, including a number of pistons 210 in an equal number of respective chambers 212 of a motor carrier 206, where the motor carrier 206 rotates a motor output shaft 239. The pistons 210 of the hydrostatic motor 204 are slidably engaged upon a fixed swash plate 238. The chambers of the pistons 214 of the hydrostatic pump 202 are in fluid communication with the chambers of the pistons 210 of the hydrostatic motor 204 via a hydraulic fluid that fills the chambers and intervening conduits. In one example, the hydrostatic pump 202 and the hydrostatic motor 204 are coupled by a first hydraulic conduit 270 and a second hydraulic conduit 272 through which the hydraulic fluid circulates between the hydrostatic pump 202 and the hydrostatic motor 204. During a first, pump mode of operation, the hydrostatic pump 202 may flow a hydraulic fluid to the hydrostatic motor 204 via the first hydraulic conduit 270, and receive the hydraulic fluid back from the hydrostatic motor 204 via the second hydraulic conduit 272. Alternatively, during a second, motor mode of operation, the hydrostatic pump 202 may flow a hydraulic fluid to the hydrostatic motor 204 via the second hydraulic conduit 272, and receive the hydraulic fluid back from the hydrostatic motor 204 via the first hydraulic conduit 270. Operation of the hydrostatic unit 200 in the pump mode and the motor mode may be controlled by an angle of the variable angle swash plate 220, where, for example, if the angle of the variable angle swash plate 220 is less than 0 (e.g., with respect to the pump carrier 208) the hydrostatic unit 200 may be operated in the pump mode, and if the angle of the variable angle swash plate 220 is greater than 0, the hydrostatic unit 200 may be operated in the motor mode.

The variable angle swash plate 220 may be coupled to a pump control piston 224, which may be actuated to adjust the angle of the variable angle swash plate 220. In one example, the variable angle swash plate 220 is coupled to the pump control piston 224 via a cam joint 222, where the angle of the swash plate 220 is adjusted as the pump control piston 224 slides within a pump control piston chamber 228 in a first direction indicated by upward arrow 230 or a second direction indicated by downward arrow 232. For example, the swash plate 220 may be rotated in a first rotational direction indicated by arrow 234 (e.g., counterclockwise) by sliding the pump control piston 224 within the pump control piston chamber 228 in the first direction indicated by upward arrow 230, and the swash plate 220 may be rotated in a second rotational direction indicated by arrow 235 (e.g., clockwise) by sliding the pump control piston 224 within the pump control piston chamber 228 in the second direction indicated by downward arrow 232.

In one example, the pump control piston 224 is actuated by hydraulic pressure, where the hydraulic fluid enters the pump control piston chamber 228 with a first pressure in the first direction indicated by upward arrow 230 via a first pump control piston valve 229, and the hydraulic fluid enters the pump control piston chamber 228 with a second pressure in the second direction indicated by downward arrow 232 via a second pump control piston valve 231. The first pump control piston valve 229 and the second pump control piston valve 231 may be proportional pressure relief valves that are continuously adjustable, where an output pressure is limited based on electrical signals received from a controller (e.g., the controller 112 of FIG. 1). In one example, the first pump control piston valve 229 and the second pump control piston valve 231 may be solenoid valves, although other suitable valves may be used such as pressure reducing valve, pressure relief valve, poppet valve and the like.

The hydrostatic unit may include one or more sensors which may be used by the controller to adjust the first pressure and/or the second pressure to control the pump control piston. For example, the pump control piston chamber 228 may include a first pressure sensor 260 arranged proximate the first pump control piston valve 229, and a second pressure sensor 262 arranged proximate the second pump control piston valve 231. As another example, the hydrostatic unit 200 may also include a swash plate angle sensor 264, which may estimate an angle of the swash plate, an input shaft torque sensor 266, an output shaft torque sensor 268, and/or other sensors. It should be appreciated that the sensors included herein are for illustrative purposes, and in other embodiments, the hydrostatic unit may include a greater or fewer number of sensors or different sensors without departing from the scope of this disclosure.

As described in greater detail below in reference to FIG. 3A, the position of the pump control piston 224 may depend on a hydrostatic differential pressure of the hydrostatic unit 200, an estimated displacement of the hydrostatic pump 202 (e.g., estimated based on the motor and pump measured speeds and estimated volumetric efficiencies under actual conditions), a speed of the pump input shaft 236, and a pressure differential between the first pressure and the second pressure. As the variables change, forces generated on the pump control piston 224 may adjust the position of the pump control piston 224 to seek an equilibrium. Thus, the position of the pump control piston 224 may be controlled by the pressure differential between the first pressure and the second pressure. For example, if the first pressure is greater than the second pressure, the pump control piston 224 may slide in the first direction indicated by upward arrow 230, causing the swash plate 220 to rotate in the first rotational direction 234. Alternatively, if the second pressure is greater than the first pressure, the pump control piston 224 may slide in the second direction indicated by downward arrow 232, causing the swash plate 220 to rotate in the second rotational direction 235.

As the angle of the swash plate 220 is adjusted, a displacement of the pump 202 (e.g., an amount of fluid displaced by the pistons 214) varies, generating a greater or lesser volume of hydraulic fluid received or taken from the chambers of the pistons 210. If a greater volume of hydraulic fluid is received from the chambers of the pistons 210, an output speed of the output shaft 239 is increased, while if a lesser volume of hydraulic fluid received from the chambers of the pistons 210, the output speed of the output shaft 239 is decreased. Thus, the output speed of the hydrostatic motor 204 varies with and is controlled by the angle of swash plate 220. In this way, a controller can control the output speed of the hydrostatic unit by actuating the first pump control piston valve 229 and the second pump control piston valve 231 to adjust the pressure differential between the first pressure on the pump control piston 224 and the second pressure on the pump control piston 224.

Further, a direction of rotation of the output shaft may be switched by adjusting the angle of the swash plate 220. For example, in the example depicted in FIG. 2, the output shaft 239 rotates in a rotational direction indicated by arrow 240, the same rotational direction as the input shaft 236 indicated by arrow 242. As the second pressure (e.g., in the second direction indicated by downward arrow 232) increases relative to the first pressure (e.g., in the first direction indicated by upward arrow 230), the pump control piston 224 slides in the second direction (e.g., down in FIG. 2). When the pump control piston 224 reaches the midpoint of the pump control piston chamber 228 indicated by dashed line 244, the swash plate 220 is adjusted to an angle of 90° relative to the pump carrier 208. At the angle of 90°, a displacement of the hydrostatic pump 202 does not vary across the number of respective chambers 216 of the pump carrier 208, whereby no rotation is generated in the output shaft 239. As the pump control piston 224 passes the midpoint of the pump control piston chamber 228 indicated by dashed line 244, the angle of the swash plate 220 is adjusted further in the second rotational direction indicated by arrow 235, whereby a rotation is generated in the output shaft 239 in a direction opposite to the arrow 240. As the angle of the swash plate 220 continues to be adjusted in the second rotational direction indicated by arrow 235, the displacement of the pump 202 (e.g., an amount of fluid displaced by the pistons 214) increases, whereby the speed of the rotation of the output shaft 239 increases, generating torque in one or more wheels of the vehicle (e.g., in the opposite direction as arrow 240).

Thus, by adjusting the first pressure and the second pressure via the first pump control piston valve 229 and the second pump control piston valve 231, the position of the pump control piston 224 may be controlled, thereby controlling the speed of the output shaft 239. In one example, a dynamic control strategy is employed to actuate the first pump control piston valve 229 and the second pump control piston valve 231 to adjust the speed of the output shaft 239 in response to input from an operator of the vehicle in real time. In one example, the control strategy dynamically generates one or more output signals to actuate the first pump control piston valve 229 and/or the second pump control piston valve 231 in accordance with a non-linear, multi-coefficient model of a feed-forward control architecture. The multi-coefficient model may rely on one or more formulas including various coefficients and variables, which may correspond to one or more forces and pressures applied to the pump control piston 224 of the hydrostatic unit 200.

Figure 3A:
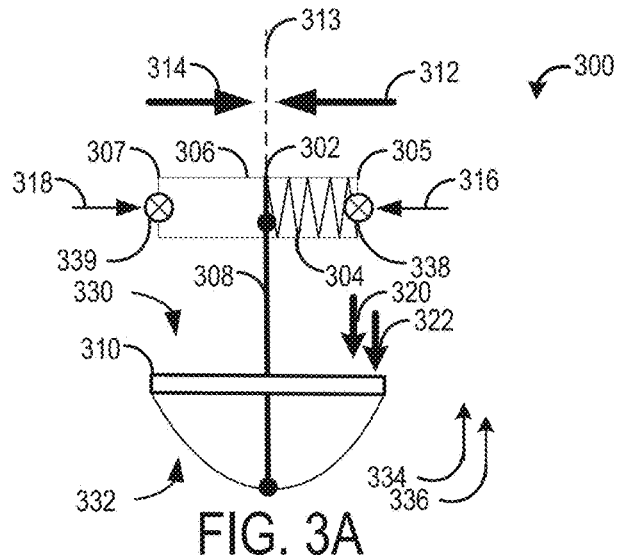
FIG. 3A is a force diagram illustrating forces on a pump control piston in a first configuration.

Referring now to FIG. 3A, a force diagram 300 illustrates examples of one or more forces and pressures applied to a pump control piston 302 in accordance with a position of a pump control piston 302 within a pump control piston chamber 306 of a hydrostatic unit of a vehicle. The pump control piston 302 and the pump control piston chamber 306 may be non-limiting examples of the pump control piston 224 and the pump control piston chamber 228 of the hydrostatic unit 200 of FIG. 2.

The pump control piston 302 may slide within the pump control piston chamber 306 in a first direction 316, or a second direction 318, where the second direction 318 is opposite the first direction 316. The position of the pump control piston 302 within the pump control piston chamber 306 may determine an angle of a swash plate 310 (e.g., the swash plate 220 of FIG. 2), which may be coupled to the pump control piston 302 via a cam joint 308, such that as the pump control piston 302 slides in the first direction 316 or the second direction 318, the angle of the swash plate 310 is adjusted accordingly.

A number of forces may be applied to the pump control piston 302 to slide the pump control piston 302 in the first direction 316 or the second direction 318. The position of the pump control piston 302 within the pump control piston chamber 306 may be controlled by actuating a first pump control piston valve 338 and/or a second pump control piston valve 339 (e.g., the first pump control piston valve 229 and/or the second pump control piston valve 231 of the hydrostatic unit 200 of FIG. 2). As the first pump control piston valve 338 is actuated open (e.g., more open), a flow of hydraulic fluid through the first pump control piston valve 338 in a direction indicated by arrow 316 is increased, applying a pressure $P_{x1}$ on the pump control piston 302 in the direction 316. Similarly, as the second pump control piston valve 339 is actuated open (e.g., more open), a flow of hydraulic fluid through the second pump control piston valve 339 in the direction 318 is increased, applying a pressure $P_{x2}$ on the pump control piston 302 in the direction 318.

The pump control piston 302 may be coupled to an end 305 of the pump control piston chamber 306 via a spring 304, with a neutral position of the spring 304 indicated by the dashed midpoint line 344 at a midpoint of the pump control piston chamber 306. When the spring 304 is at the neutral position and the pump control piston 302 is at the midpoint of the pump control piston chamber 306, the swash plate 310 may be perpendicular (e.g., at a 90° angle) to the pump control piston chamber 306, whereby a displacement of the hydrostatic pump is 0 (e.g., where no hydraulic flow is generated on a hydrostatic motor of the hydrostatic unit). Due to the neutral position of the spring 304 being at the midpoint of the pump control piston chamber 306, as the pump control piston 302 slides from the neutral position in the first direction 316, the spring 304 may apply a mechanical pressure $P_{spring}$ on the pump control piston 302 in the second direction 318, and as the pump control piston 302 slides from the neutral position in the second direction 318, the spring 304 may apply a mechanical pressure $P_{spring}$ on the pump control piston 302 in the first direction 316. Thus, when the pressure $P_{x1}$ (e.g., exerted by oil in the pump control chamber 306) is greater than the pressure $P_{x2}$, the mechanical pressure $P_{spring}$ may be added to the pressure $P_{x2}$ (e.g., counteracting the greater pressure $P_{x1}$) due to an expansion of the spring 304. Similarly, when the pressure $P_{x2}$ is greater than the pressure $P_{x1}$, mechanical pressure $P_{spring}$ may be added to the pressure $P_{x1}$ (e.g., counteracting the greater pressure $P_{x2}$) due to a contraction of the spring 304.

Additional pressures may be generated on the pump control piston 302 as a result of forces applied by a plurality of pistons of a pump carrier (not shown in FIGS. 3A-3C) on the swash plate 310. As described above in reference to FIG. 2, a number of pistons (not shown in FIG. 3A) of the hydrostatic pump (e.g., the pistons 214 of the hydrostatic pump 202 of FIG. 2) may be slidably coupled to the swash plate 310, where the number of pistons may apply a force $F_{j\_piston}$ on the swash plate 310 in a direction indicated by an arrow 320. The force $F_{j\_piston}$ on the swash plate 310, which may depend on a piston mass, a pump shaft speed, and a variable pump displacement, may generate a pressure $P_{J\_piston}$ on the pump control piston 302. Additionally, a force $F_{pDiff}$ may be applied to the swash plate 310 in a direction indicated by an arrow 322, where the force $F_{pDiff}$ is a force acting on the swash plate 310 due to a hydrostatic differential pressure $p_{Diff}$ of a hydraulic fluid circulating between a hydrostatic pump and a hydrostatic motor of the hydrostatic unit. A gain from the differential pressure $p_{Diff}$ to $F_{pDiff}$ may depend on characteristics of the hydrostatic pump, such as a pump timing angle. In one example, the number of pistons are housed within a corresponding number of chambers of a pump carrier (not shown in FIG. 3A) arranged on a first side 330 of the swash plate 310, between the pump control piston chamber 306 and the swash plate 310. In another example, the pump carrier is arranged on a second, opposite side 332 of the swash plate 310, where the swash plate 310 is between the pump control piston chamber 306 and the pump carrier, and where the force Fj is applied to the swash plate 310 in a direction indicated by an arrow 334 (e.g., opposite to the arrow 320), and the force $F_{pDiff}$ is applied to the swash plate 310 by in a direction indicated by an arrow 336 (e.g., opposite to the arrow 322).

The configuration of the hydrostatic unit may change, which may result in a change of the hydrostatic differential pressure $p_{Diff}$, which applies a proportional pressure $P_{pDiff}$ to the pump control piston 302. The hydrostatic differential pressure $p_{Diff}$ and the pressure $P_{pDiff}$ may depend on a load applied to wheels of the vehicle, as commanded by an operator of the vehicle. The first pump control piston valve 338 and the second pump control piston valve 339, respectively, may have to be actuated to adjust the pressures $P_{x1}$ and $P_{x2}$ based on the pressure $P_{pDiff}$ (e.g., on vehicle tractive effort and/or transmission load). Therefore, the differential pressure $p_{Diff}$ may be an input into the non-linear, multi-coefficient model used to control the pump control piston 302 along with the pressures $P_{x1}$ and $P_{x2}$.

The pressure $P_{pDiff}$ may be assigned a direction based on a sign of $p_{Diff}$, and the pressure $P_{J\_piston}$ may be assigned a direction based on the angle of the swash plate 310 (e.g., whether it is positive or negative). For example, the pressure $P_{J\_piston}$ may be defined relative to the first side 305 of the pump control piston chamber 306, where the pressure $P_{J\_piston}$ is applied in a direction indicated by arrow 312, or the pressure $P_{J\_piston}$ may be defined relative to the second, opposite side 307 of the pump control piston chamber 306, where the pressure $P_{J\_piston}$ is applied in a direction indicated by arrow 314. Thus, the position of the pump control piston 302 within the pump control piston chamber 306 may be based on a plurality of pressures, including a difference between the pressure $P_{x1}$ and the pressure $P_{x2}$; the pressure $P_{J\_piston}$ on the pump control piston 302; the pressure $P_{spring}$, which may be applied against the greater of the pressure $P_{x1}$ and the pressure $P_{x2}$; and the pressure $P_{pDiff}$, which depends on the load applied to wheels of the vehicle. FIG. 3A may depict a first equilibrium state between the plurality of pressures, where in the first equilibrium state the pump control piston 302 is at a midpoint of the pump control piston chamber 306.

Figure 3B:
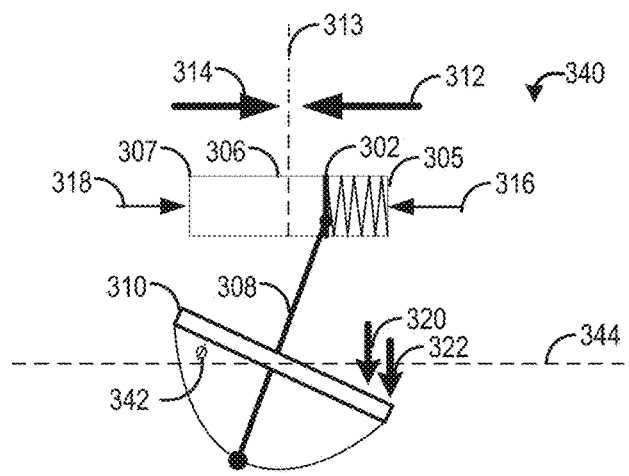
FIG. 3B is a force diagram illustrating forces on a pump control piston in a second configuration.

Referring to FIG. 3B, a force diagram 340 illustrates examples of the one or more forces and pressures applied to the pump control piston 302 in a second equilibrium state. In one example, as a result of an increase in the pressure $P_{x2}$ and a corresponding decrease in the pressure $P_{x1}$, the pump control piston 302 slides within the pump control piston chamber 306 in the second direction indicated by the arrow 314, and the spring 304 is contracted beyond the neutral point indicated by dashed line 313. As the pump control piston 302 slides within the pump control piston chamber 306, an angle 342 of the swash plate 310 with respect to the pump control piston chamber 306 increases, where the angle 342 is depicted in FIG. 3B between the swash plate 310 and a dashed line 344 parallel to the pump control piston chamber 306. As the angle 342 of the swash plate 310 increases, a displacement of the number of pistons of the hydrostatic pump slidably coupled to the swash plate 310 increases, powering the hydrostatic motor of the hydrostatic unit (not shown in FIGS. 3A-3C) to rotate an output shaft of the hydrostatic unit in a first rotational direction. In FIG. 3B, the pressure $P_{J\_piston}$ is defined relative to the second, opposite side 307 of the pump control piston chamber 306, and is applied to the pump control piston 302 in the direction indicated by arrow 314. A negative pressure $P_{pDiff}$ is applied to the pump control piston 302 in the direction indicated by arrow 312, based on a sign of the differential pressure $p_{Diff}$. As the angle 342 of the swash plate 310 increases, the force $F_{pDiff}$ is applied to the swash plate 310 by the differential pressure $p_{Diff}$ in a direction indicated by an arrow 322, where the force $F_{pDiff}$ is a function of the differential pressure $p_{Diff}$ and the angle 342, and the force FJ piston is applied to the swash plate 310 in a direction indicated by an arrow 320, also as a function of the angle 342.

Figure 3C:
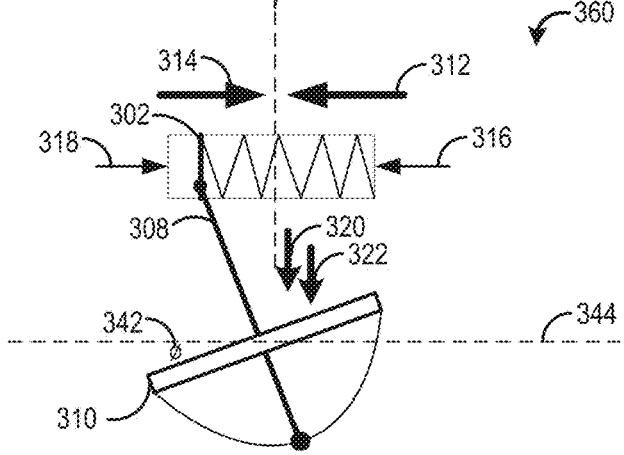
FIG. 3C is a force diagram illustrating forces on a pump control piston in a third configuration.

Referring now to FIG. 3C, a force diagram 360 illustrates examples of the one or more forces and pressures applied to the pump control piston 302 under a third equilibrium state. As a result of an increase in the pressure $P_{x1}$ and a corresponding decrease in the pressure $P_{x2}$, the pump control piston 302 slides within the pump control piston chamber 306 in the first direction indicated by the arrow 314, and the spring 304 is expanded beyond the neutral point indicated by dashed line 313. As the pump control piston 302 slides within the pump control piston chamber 306, the angle 342 of the swash plate 310 with respect to the pump control piston chamber 306 increases in a negative direction, where the angle 342 is depicted in FIG. 3C between the swash plate 310 and a dashed line 344 parallel to the pump control piston chamber 306. As the angle 342 of the swash plate 310 increases negatively, a displacement of the number of pistons of the hydrostatic pump slidably coupled to the swash plate 310 increases, powering the hydrostatic motor of the hydrostatic unit (not shown in FIGS. 3A-3C) to rotate an output shaft of the hydrostatic unit in a second, opposite rotational direction as described above in reference to FIG. 3B. In FIG. 3C, the pressure $P_{J\_piston}$ is defined relative to the first side 305 of the pump control piston chamber 306, where the pressure $P_{J\_piston}$ is applied to the pump control piston 302 in the direction indicated by arrow 312, based on the angle 342 of the swash plate 310. It will be understood that the pressure $P_{J\_piston}$ is proportional to the angle 342.

Figure 4A:
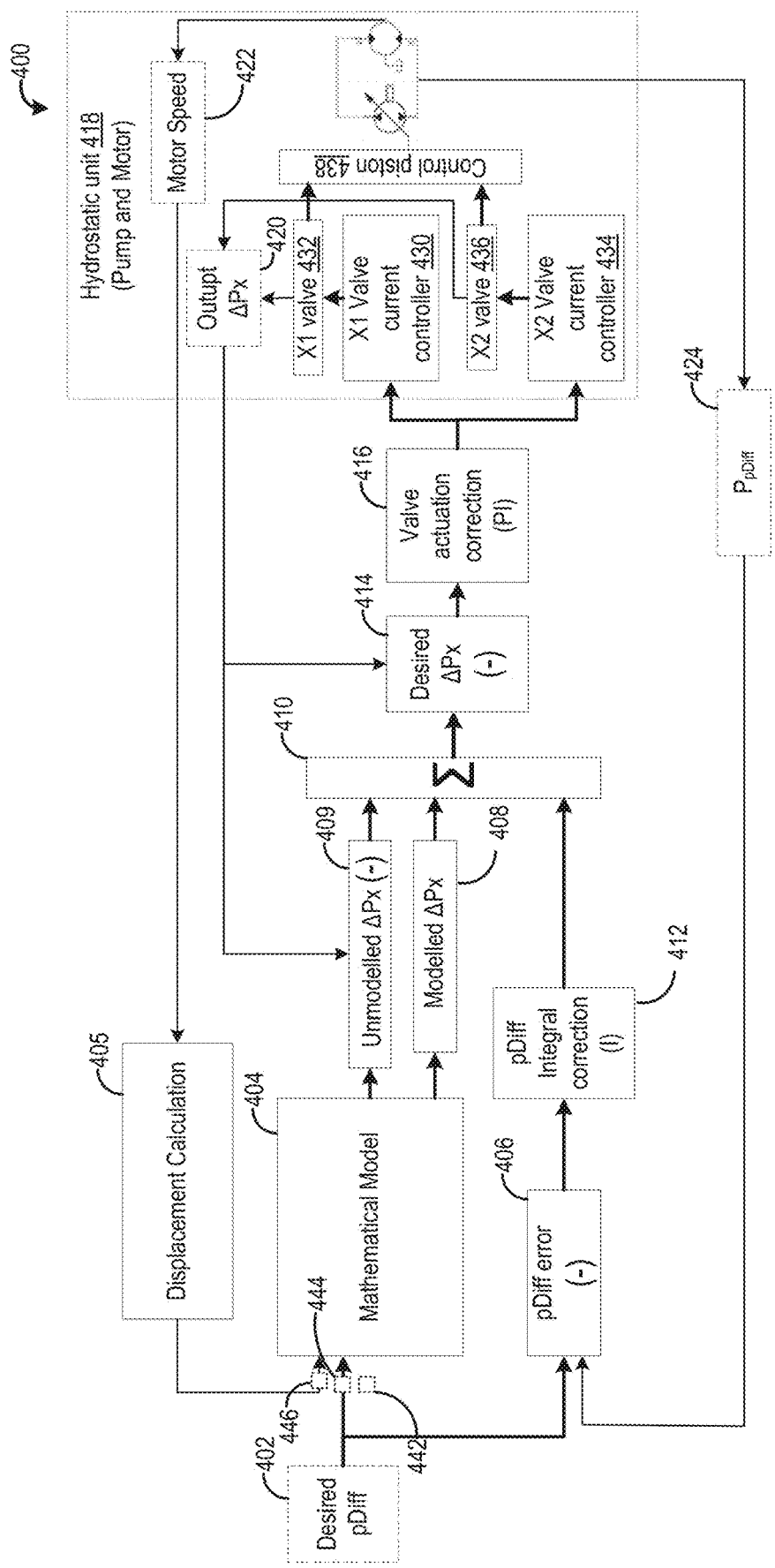
FIG. 4A is a diagram of a first feedforward control architecture.

Referring now to FIG. 4A, a diagram of a first feedforward control architecture 400 is shown for regulating the hydrostatic differential pressure pDiff, by controlling a pressure differential of a hydraulic fluid on two sides of a pump control piston 438. The piston position of a pump control piston 438 is naturally adjusted based on the equilibrium described in previous and following paragraphs. The pump control piston 438 and the pump control piston chamber may be non-limiting examples of the pump control piston 302 and the pump control piston chamber 306 and/or the pump control piston 224 and the pump control piston chamber 228 of the hydrostatic unit 200. The control architecture 400 may be implemented as logic modules stored in memory and executable by a processor. Specifically, the different blocks in the control architecture may be conceptually divided into separate modules each with sets of instructions that correspond to control strategies elaborated upon herein. The pump control piston 438 may control a displacement of a hydrostatic pump of a hydrostatic unit 418, that is fluidly coupled to a hydrostatic motor of the hydrostatic unit 418, as described above in reference to FIG. 2. The first feedforward control architecture 400 may be implemented by a controller of a vehicle with an HVT, such as the controller 112 of FIG. 1, to control the hydrostatic unit 418 in a feedforward torque control mode. A processor of the controller (e.g., the processor 140 of the controller 112 of FIG. 1) may execute instructions stored on a memory of the controller (e.g., the memory 142 of the controller 112 of FIG. 1) to implement the first feedforward control architecture 400. In an embodiment, the first feedforward control architecture 400 uses a non-linear, multi-coefficient model 404 to estimate the pressure differential of the hydraulic fluid on the two sides of a pump control piston 438. The model 404 specifically characterizes the equilibrium of the pressures acting on the pump control piston 438.

In one example, the model 404 is derived using the Newton-Euler formula:

$$J\ddot{\alpha}_{pump} = F(p_{Diff}, \alpha_{pump}, \Delta P_x) \quad (1)$$

where J is an inertia of the modelled system, $\alpha_{pump}$ is a variable displacement of the hydrostatic pump measured or estimated based on a speed of the hydrostatic motor, $p_{Diff}$ is a hydrostatic differential pressure of a hydraulic fluid of the hydrostatic pump, as described above in reference to FIGS. 3A-3C, and $\Delta P_x$ is a pressure differential between a pressure $P_{x1}$ applied to the pump control piston in a first direction and a pressure $P_{x2}$ applied to the pump control piston in a second direction. The differential pressure $p_{Diff}$, pressure $P_{x1}$, and the pressure $P_{x2}$ may be the same as or similar to the differential pressure $p_{Diff}$, pressure $P_{x1}$, and the pressure $P_{x2}$ described above in reference to FIGS. 3A-3C. The model 404 implements an equation based on the Newton-Euler formula, where $J\ddot{\alpha}_{pump}$ is eliminated due to a negligible inertia J of moving components of the modelled system (e.g., pump control piston, swash plate, and pump pistons) as follows:

$$A_{(n_{engine})} p_{Diff} + B_{(n_{engine})} p_{Diff}^2 + SW_{(n_{engine}, motor\ mode)} \cdot |\alpha_{pump}| \cdot p_{Diff} + F_{(n_{engine})} \cdot \alpha_{pump} = \Delta P_x \quad (2)$$

In equation (2) A is a first coefficient, B is a second coefficient, SW is a third coefficient, F is a fourth coefficient (also collectively referred to herein as the coefficients), and $n_{engine}$ is a speed of the engine (which may be a gain of the pump speed, as the pump speed and the engine speed are mechanically linked). Prior to operating the HVT, the first coefficient A, the second coefficient B, the third coefficient SW, and the fourth coefficient F may be calibrated. In one example, the coefficients may be calibrated via an automatic calibration procedure implemented at a late stage in manufacturing and at predetermined operating intervals (e.g., at servicing intervals). During the automatic calibration procedure, $\Delta P_x$, $p_{Diff}$, and $\alpha_{pump}$ may be measured or estimated at different engine speeds $n_{engine}$, and the coefficients may be calibrated based on a trend of the coefficients. An example automatic calibration procedure is described below in reference to FIG. 5. In one example, the hardware in the pump may be designed to increase (e.g., maximize) the gain between $p_{Diff}$ and $\Delta P_x$. Further, the coefficients SW and B and corresponding terms were unexpectedly identified using extensive research and development.

The model 404 receives as an input signal a desired hydrostatic differential pressure $p_{Diff}$ 402. The desired differential pressure $p_{Diff}$ 402 may be determined by the controller based on an input signal from an operator of the vehicle. For example, the operator may increase a pressure on an accelerator pedal of the vehicle to increase an amount of torque delivered to one or more wheels of the vehicle, or the operator may decrease the pressure on an accelerator pedal of the vehicle to decrease the amount of torque delivered to the one or more wheels of the vehicle. In one example, desired differential pressure $p_{Diff}$ 402 may be proportional to a position of the accelerator. The differential pressure $p_{Diff}$ 402 may depend on an angle of a swash plate of the hydrostatic unit, where an increase in a magnitude of the angle of the swash plate may cause the differential pressure $p_{Diff}$ 402 to increase, and a decrease in the magnitude of the angle of the swash plate may cause the differential pressure $p_{Diff}$ 402 to decrease. The differential pressure $p_{Diff}$ 402 may be maximized when the angle of the swash plate is at a maximum angle, whereby if the operator presses the accelerator pedal to a fully depressed position, the swash plate is at the maximum angle.

The model 404 also receives as input signals a measured differential pressure $p_{Diff}$ 424 (e.g., a difference between measurements of pressure sensors of the hydrostatic unit), and an output of a displacement calculation block 405, which takes as an input a motor speed 422 estimated by speed sensors of the motor of the first feedforward control architecture 400. The output of the displacement calculation block 405 is an estimated pump displacement calculated based on the motor speed 422 and known motor efficiency terms.

An output of the model 404 is a modelled $\Delta P_x$ 408, which is a desired $\Delta P_x$ that is a result of the equation (2) above. The model 404 also outputs an unmodelled $\Delta P_x$ to an unmodelled $\Delta P_x$ block 409. The unmodelled $\Delta P_x$ block 409 corrects for model errors (e.g., from control disturbances due to frictions and uncertainties, etc.), outputting a difference between the unmodelled $\Delta P_x$ and a differential pressure of the pump control piston $\Delta P_x$ 420, where the differential pressure $\Delta P_x$ 420 is a measured difference between two pressure sensors arranged at opposite ends of the pump control chamber after a previous cycle of the feedforward control architecture 400.

In addition to being an input into the model 404, the desired hydrostatic differential pressure $p_{Diff}$ 402 is also an input into a $p_{Diff}$ error block 406. A second input into the $p_{Diff}$ error block 406 is the measured differential pressure $p_{Diff}$ 424. The $p_{Diff}$ error block 406 outputs a difference (e.g., a $p_{Diff}$ error) between the differential pressure $p_{Diff}$ 424 and the desired differential pressure $p_{Diff}$ 402, which is an input into a $p_{Diff}$ integral correction block 412. The $p_{Diff}$ integral correction block 412 may adjust the $p_{Diff}$ error, correcting for actuation errors, model errors, and so forth.

The modelled $\Delta P_x$ 408 is a first input into a summation block 410. A second input into the summation block 410 is a difference between the $\Delta P_x$ 420 and the unmodelled $\Delta P_x$ of the unmodelled $\Delta P_x$ block 409, scaled by a gain factor. A third input into the summation block 410 is the output of the $p_{Diff}$ integral correction block 412. The summation block 410 sums the first input, the second input, and the third input to output a desired $\Delta P_x$, which is an input of the $\Delta P_x$ error block 414. A second input into the $\Delta P_x$ error block 414 is the measured output $\Delta P_x$ 420 of a previous cycle. The output of the $\Delta P_x$ error block 414 is a difference between the measured output $\Delta P_x$ 420 and the desired $\Delta P_x$ 414 (e.g., the summation of the first input, the second input, and the third input), which is an input into a valve actuation correction block 416. The valve actuation correction block 416 translates the desired pressure $\Delta P_x$ 414 in set-point current for an X1 valve 432 and an X2 valve 436, controlled by an X1 valve current controller 430 and an X2 current controller 434, respectively. The valve actuation correction block 416 may also correct for error in valve actuation (e.g., valve hysteresis, flow effect, etc.), where the output of the valve actuation correction block 416 is outputted to the X1 valve current controller 430 and the X2 current controller 434, respectively, which control the current in solenoids of X1 valve 432 and X2 valve 436. The controlled current is fed into the X1 valve 432 and X2 valve 436, which control the pressures $P_{x1}$, and $P_{x2}$ on the pump control piston 438. In other words, The output of block 416 is split and actuated by the two solenoids of the pressure valves controlling the pressures on the pump control piston chambers. Thus, in the torque control mode shown in FIG. 4A, the first feedforward control architecture 400 dynamically adjusts the $\Delta P_x$ 420 based on the measured differential pressure $p_{Diff}$ 424 to achieve the target, desired differential pressure $p_{Diff}$ 402 (based on operator input). The adjusted output $\Delta P_x$ 420 may be used by the controller to adjust the pressures $P_{x1}$, and $P_{x2}$ by actuating their respective valves X1 valve 432 and X2 valve 436 (e.g., the first pump control piston valve 229 and the second pump control piston valve 231 of the hydrostatic unit 200 of FIG. 2). Concurrently, torque is generated in one or more wheels of the vehicle as a function of the differential pressure $p_{Diff}$ 424, according to the following equation:

$$\text{Torque} = K \cdot \eta \cdot p_{Diff} \quad (3)$$

where η is a coefficient representing a hydromechanical efficiency of the motor 418, and K is a coefficient representing a mechanical gain from the motor 418 to the wheels.

Figure 4B:
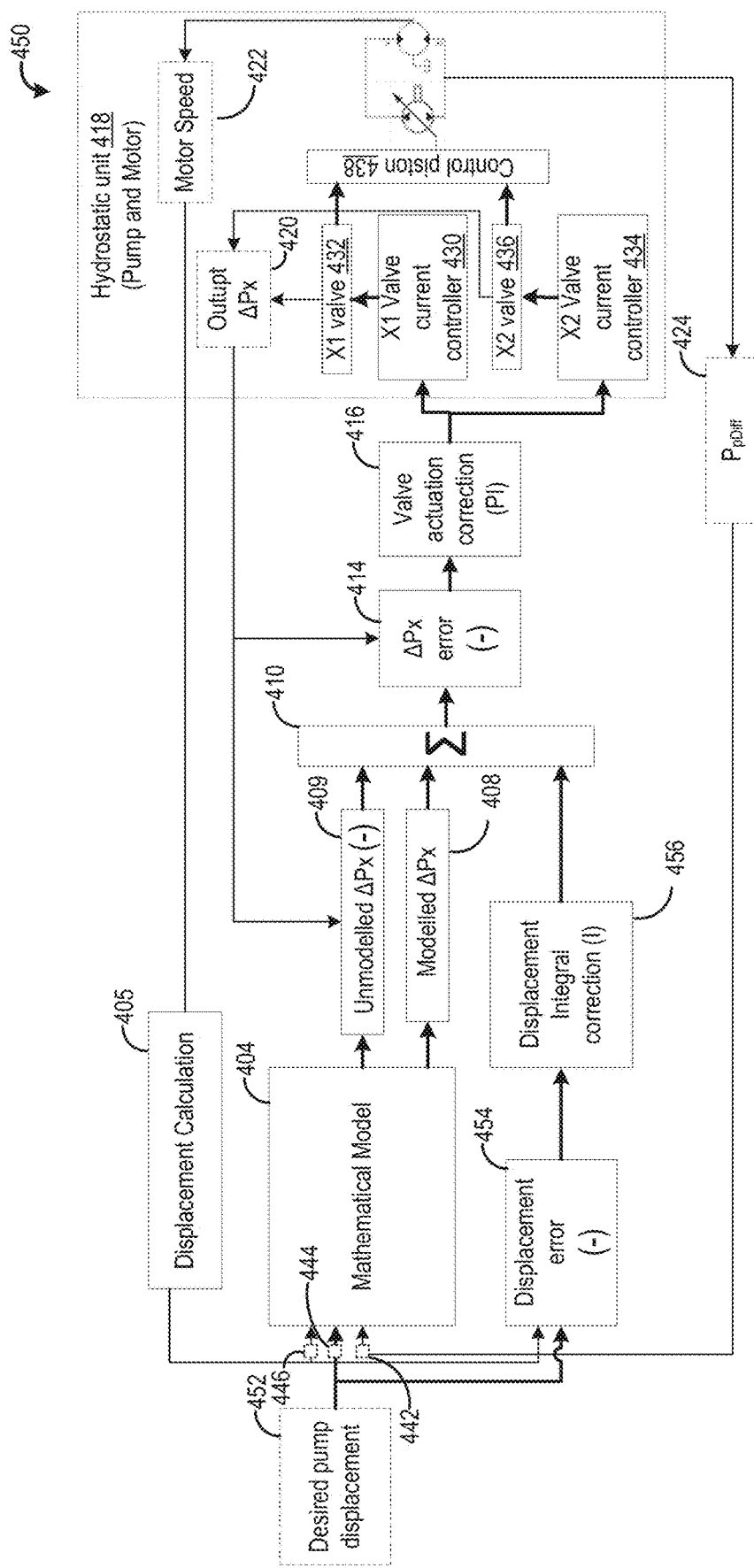
FIG. 4B is a diagram of a second feedforward control architecture.

Certain control strategies may involve switching between the torque and speed control modes, embodied via the control architectures 400 and 450 illustrated in FIGS. 4A and 4B, respectively. When switching between the torque and speed control modes, a discontinuity may be perceived by the operator of the vehicle. In one example, the discontinuity is reduced by including junction filters 442, 444, and 446 on inputs of the feedforward terms. The discontinuity may also be reduced by smart initialization of an integral term of the $p_{Diff}$ integral correction block 412 and/or the displacement integral correction block 456, where a step in the integral term is averted by establishing a functional requirement that a contribution of the integral term at a mode switch be equal to a contribution of the integral term at a previous step. To meet this requirement, the integral term may be reset to a last output value when a mode switch occurs.

Referring now to FIG. 4B, a diagram of a second feedforward control architecture 450 is shown for adjusting a position of the pump control piston 438 of the hydrostatic unit 418 to a desired position, by controlling a pressure differential of a hydraulic fluid on two sides of the pump control piston 438. The pump control piston may be a non-limiting example of the pump control piston 302 and/or the pump control piston 224 of the hydrostatic unit 200. The pump control piston 438 may control a displacement of a hydrostatic pump of the hydrostatic unit that is fluidly coupled to a hydrostatic motor of the hydrostatic unit, as described above in reference to FIG. 2. The second feedforward control architecture 450 may be implemented by a controller of a vehicle with an HVT, such as the controller 112 of FIG. 1, to control the hydrostatic unit 418 in a feedforward speed control mode (e.g., rather than the torque control mode of FIG. 4A). A processor of the controller (e.g., the processor 140 of the controller 112 of FIG. 1) may execute instructions stored on a memory of the controller (e.g., the memory 142 of the controller 112 of FIG. 1) to implement the second feedforward control architecture 450.

The second feedforward control architecture 450 may be substantially similar to the first feedforward control architecture 400 described above in reference to FIG. 4A, and may share many of the components of the first feedforward control architecture 400, which are similarly numbered for clarity. In particular, the second feedforward control architecture 450 uses the same model 404 to estimate pressures and forces of the hydrostatic unit, with the same coefficients and parameters. As in the torque control mode of the first feedforward control architecture 400, in the speed control mode, the model 404 may be used to adjust the $\Delta P_x$ 420 based on a desired pump displacement 452. The desired pump displacement 452 is an input into the model 404, along with the differential pressure $p_{Diff}$ 424 and the output of the displacement calculation block 405. The $p_{Diff}$ error block 406 and the $p_{Diff}$ integral correction block 412 of the first feedforward control architecture 400 of FIG. 4A are replaced by a displacement error block 454 and a displacement integral correction block 456, respectively. The desired pump displacement 452 is an input into the displacement error block 454, in parallel with the model 404. An additional input into the displacement error block 454 is the output of the displacement calculation block 405. The displacement error block 454 outputs a difference (e.g., a displacement error) between the desired pump displacement 452 and the output of the displacement calculation block 405, which is an input into the displacement integral correction block 456. The displacement integral correction block 456 adjusts the displacement error, correcting for actuation errors, model errors, and so forth. The output of the displacement integral correction block 456 is a third input into the summation block 410, along with the modelled $\Delta P_x$ 408 (the first input into a summation block 410) and the difference between the $\Delta P_x$ 420 and the unmodelled $\Delta P_x$ scaled by the gain factor (the second input into the summation block 410). As described above in reference to FIG. 4A, the summation block 410 sums the first input, the second input, and the third input to output a desired $\Delta P_x$, which is inputted into $\Delta P_x$ error block 414. The remaining components of the second feedforward control architecture 450 are identical to the first feedforward control architecture 450 of FIG. 4A.

Thus, in the speed control mode shown in FIG. 4B, the second feedforward control architecture 450 dynamically adjusts the pump displacement by minimizing a difference between the output of the displacement calculation block 405 based on the motor speed 422 of the motor and the target, desired pump displacement 452, thereby generating an adjusted $\Delta P_x$ 420 that may be used by the controller to adjust the pressures $P_{x1}$, and $P_{x2}$ by actuating their respective valves (e.g., X1 valve 432 and X2 valve 436). In one example, the desired pump displacement 452 is generated by the controller based on operator input via an input device (e.g., one of the input devices 114 of the HVT control system 100 of FIG. 1), for example, when engaging a first forward drive clutch or reverse drive clutch via an FNR lever. Concurrently, the motor speed is controlled as a function of the pump displacement $\alpha_{pump}$, according to the following equation:

$$\text{Speed} = K \cdot \eta \cdot \text{Displ} \quad (3)$$

Where η is the coefficient representing the volumetric efficiency of the hydrostatic unit, and K is the coefficient representing a mechanical gain from the motor 418 to the wheels.

Figure 5:
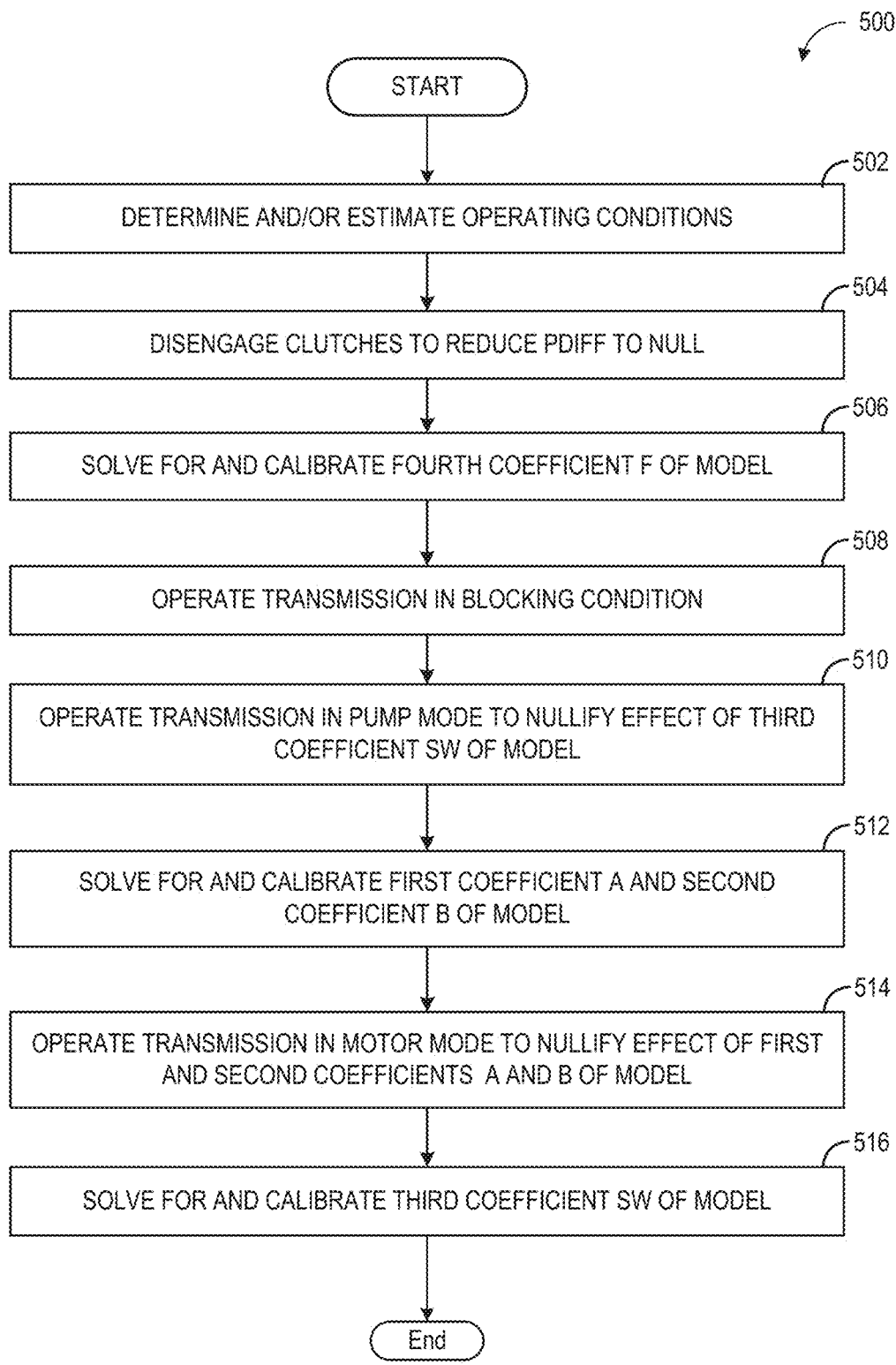
FIG. 5 is a flowchart that illustrates a procedure for calibrating coefficients of a non-linear, multi-coefficient model.
Figure 6:
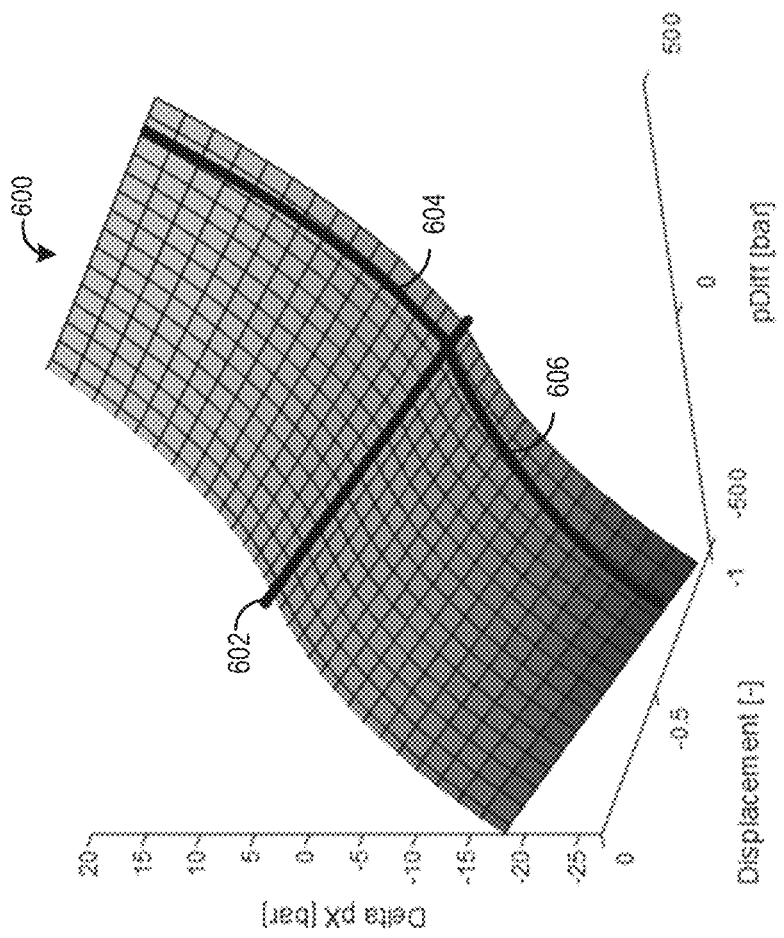
FIG. 6 is a 3D surface plot showing a change in a pressure differential between two sides of a pump control piston as a function of pump displacement and differential pressure of a hydraulic fluid of a hydrostatic unit.

Referring now to FIG. 5, a flowchart of an exemplary method 500 is shown for calibrating a first coefficient A, a second coefficient B, a third coefficient SW, and a fourth coefficient F (herein, the coefficients) of a non-linear, multi-coefficient model (herein, the model), where the model is implemented within a feed-forward control architecture for controlling a pump control piston of a hydrostatic unit of an HVT, such as the pump control piston 224 of the hydrostatic unit 200 of FIG. 2. The first coefficient A, the second coefficient B, the third coefficient SW, and the fourth coefficient F may be the same as or similar to the first coefficient A, the second coefficient B, the third coefficient SW, and the fourth coefficient F of the non-linear, multi-coefficient model 404 of FIGS. 4A and 4B. In an embodiment, operations of method 500 may be stored in non-transitory memory and executed by a processor, such as memory 142 and processor 140 of the HVT control system 100 of FIG. 1, respectively, during operation of an HVT such as the HVT 101 of the HVT control system 100 of FIG. 1. As described above in reference to FIG. 4A, during the automatic calibration procedure, $\Delta P_x$, $p_{Diff}$, and $\alpha_{pump}$ may be measured or estimated n times at different engine speeds $n_{engine}$, and the coefficients may be calibrated based on a trend of the coefficients, in accordance with the modified Newton-Euler formula described above in reference to FIG. 4A:

$$A_{(n_{engine})}p_{Diff} + B_{(n_{engine})}p_{Diff}^2 + SW_{(n_{engine} \cdot motor\ mode)} \cdot \alpha_{pump} \cdot p_{Diff} + F_{(n_{engine})} \cdot \alpha_{pump} = \Delta P_x \quad (4)$$

At 502, method 500 includes estimating and/or measuring vehicle operating conditions. Vehicle operating conditions may be estimated based on one or more outputs of various sensors of the vehicle (e.g., such as an oil temperature sensor, engine velocity or wheel velocity sensor, torque sensor, swash plate angle sensor, pressure sensor, etc., as described above in reference to the HVT control system 100 of FIG. 1 and the hydrostatic unit 200 of FIG. 2). Vehicle operating conditions may include engine velocity and load, vehicle velocity, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor velocity, battery charge, engine torque output, vehicle wheel torque, etc. Estimating and/or measuring vehicle operating conditions may include determining whether the vehicle is being powered by an engine or an electric motor (e.g., the power source 102 of the HVT control system of FIG. 1).

At 504, method 500 includes disengaging a plurality of drive clutches of the HVT (e.g., the reverse drive clutch 160, first forward drive clutch 162, and second forward drive clutch 164 of the HVT control system 100 of FIG. 1). By disengaging the plurality of drive clutches of the HVT, a differential pressure $p_{Diff}$ may be reduced to null due to the hydraulic motor of the HVT generating a torque that is close to null, where a negligible amount of torque is generated to counteract an internal friction of the hydraulic motor and/or attached gears, bearings, and clutches. As $p_{Diff}$ is (approximately) linearly proportional to motor torque, $p_{Diff}$ reduces to near 0. When the differential pressure $p_{Diff}$ is reduced to null, the first three terms of the modified Newton-Euler formula may be eliminated, leaving the following equation:

$$F_{(n_{engine})} \cdot \alpha_{pump} = \Delta P_x \quad (5)$$

which may be reformulated as the following "no load curve" equation:

$$F_{(n_{engine})} = \frac{\Delta P_x}{\alpha_{pump}} \quad (6)$$

At 506, method 500 includes calibrating the fourth coefficient F of the model at a plurality of different engine speeds (e.g., three or more engine speeds). To determine the coefficient F, the clutches in the transmission are disengaged which results in a no load condition where $p_{Diff}$ is zero. In one example, the calibration curve for the coefficient F, referred to as the "no load curve," is solved for by swiveling the pump under the no load condition Referring briefly to FIG. 6, a use-case three dimensional (3D) surface plot 600 is shown of the relationship between $\Delta P_x$, the pump displacement $\alpha_{pump}$ and the differential pressure $p_{Diff}$ at a selected engine speed as dictated by equation (4). The relationships shown in FIG. 6 correspond to an exemplary variable displacement pump and the numerical values for the variables are therefore for illustration purposes only and are not meant to be limiting. A no load curve 602 where the differential pressure $p_{Diff}$ is 0 and the pump is swivelled through its angular range is indicated on the surface plot. As previously mentioned, the calibration curve corresponding to the coefficient F may be repeated at a plurality of engine speeds.

At 508, method 500 includes operating the HVT in a blocking condition. In one example, the blocking condition is generated by engaging two clutches of the HVT, thereby locking a transmission output of the HVT (e.g., whereby no torque is delivered to one or more wheels of the vehicle). For example, if there are three drive clutches, a reverse drive clutch and a first forward drive clutch (e.g., the first forward drive clutch 162 and the reverse drive clutch 160 of FIG. 1) may be engaged. During operation in the blocking condition, an increase or decrease in $\Delta P_x$ generates a corresponding increase or decrease in the differential pressure $p_{Diff}$.

At 510, method 500 includes operating a hydrostatic unit of the HVT in a pump mode during the blocking condition. For example, the hydrostatic unit may include a hydrostatic pump and a hydrostatic motor (e.g., the hydrostatic pump 202 and the hydrostatic motor 204 of the hydrostatic unit 200 of FIG. 2), where the hydrostatic unit may be operated in a pump mode or a motor mode by adjusting an angle of a swash plate of the hydrostatic unit, as described above in reference to FIG. 2. The hydrostatic unit may be operated in the pump mode by adjusting the swash plate to have a positive angle with respect to a pump control piston (e.g., the pump control piston 224 of FIG. 2) whereby a rotation of a pump carrier of the hydrostatic pump (e.g., the pump carrier 208 of FIG. 2) causes the hydrostatic motor to rotate in a first direction, or the hydrostatic unit may be operated in the motor mode by adjusting the swash plate to have a negative angle with respect to a pump control piston, whereby the rotation of a pump carrier causes the hydrostatic motor to rotate in a second direction. Since the terms of the equation (4) with coefficients A and B apply to the pump mode, and the term of the equation (4) with the coefficient SW applies to the motor mode, A, B, and SW may be calculated by selectively operating the hydrostatic unit of the HVT in the pump mode or the motor mode to alternately eliminate and solve for the relevant term(s) of the equation (4). During operation in the pump mode, $\Delta P_x$ is increased to increase $p_{Diff}$, while during operation in the motor mode, $\Delta P_x$ is decreased to decrease $p_{Diff}$.

Since the third coefficient SW of the model only applies in a "motor mode", by operating the HVT in the pump mode, an effect of the coefficient SW may be nullified, allowing the third term of the modified Newton-Euler formula above to be eliminated, leaving the following "load curve" equation:

$$A_{(n_{engine})}p_{Diff}+B_{(n_{engine})}p_{Diff}^2+F_{(n_{engine})}\cdot\alpha_{pump}=\Delta P_x \quad (7)$$

which may be reformulated as follows:

$$A_{(n_{engine})}p_{Diff}+B_{(n_{engine})}p_{Diff}^2=\Delta P_x-F_{(n_{engine})}\cdot\alpha_{pump} \quad (8)$$

where F is known.

At 512, method 500 includes calibrating the first coefficient A and the second coefficient B of the modified Newton-Euler formula after the coefficient F is known, where the coefficients A and B are the linear and quadratic coefficients, respectively, of the "load curve" parabola. As described above, method 500 includes increasing the $\Delta P_x$ (e.g., by operating in the pump mode) and calibrating the coefficients A and B at a number n of different engine speeds, where a trend in the coefficients A and B are used to calibrate the coefficients A and B. Referring again to FIG. 6, the load curve representing the calibration curve of coefficients A and B is indicated at 606. As shown, the load curve 606 is determined by increasing $\Delta P_x$ and $p_{Diff}$ relative to the pump displacement @pump. This calibration curve procedure may again be repeated at different engine speeds.

At 514, method 500 includes switching from the pump mode to a motor mode, and operating the HVT in the motor mode to decrease $\Delta P_x$ and the differential pressure $p_{Diff}$ once the coefficients A, B, and F have been determined, where the modified Newton-Euler formula is now inverted in a "drag curve" equation as follows:

$$SW_{(n_{engine};motor\ mode)}=\Delta P_x-A_{(n_{engine})}p_{Diff}+B_{(n_{engine})}p_{Diff}^2-F_{(n_{engine})}\cdot\alpha_{pump}/|\alpha_{pump}|\cdot p_{Diff} \quad (9)$$

At 516, method 500 includes solving for and calibrating the third coefficient SW of the model. As described above, method 500 includes decreasing the $\Delta P_x$ and calibrating the coefficient SW at a number n of different engine speeds, where a trend in the coefficient SW is used to calibrate the coefficient SW. Referring again to FIG. 6, the coefficient curve SW (referred to as the drag curve) along the experimental map is indicated at 604. To elaborate, the drag curve may be found by inverting equation (9) and decreasing $\Delta P_x$ and $p_{Diff}$ relative to the pump displacement $\alpha_{pump}$.

Thus, an automatic procedure for calibrating the four coefficients is proposed, where each of the four coefficients are calibrated in turn. Clutches are first disengaged to solve for a coefficient F; clutches are subsequently engaged to increase $\Delta P_x$ while operating the hydrostatic unit in the pump mode to solve for the coefficients A and B, respectively; and then the hydrostatic unit is operated in the motor mode to decrease $\Delta P_x$ to determine the coefficient SW. Values of the coefficients are determined in n trials with n different engine speeds, and the coefficients are calibrated based on trends in the values of the coefficients over the n trials. After the calibration procedure, a common non-linear, multi-coefficient model (e.g., the modified Newton-Euler formula) may be used as a block in a first control architecture for controlling the hydrostatic unit in a torque control mode, and/or as a block in a second control architecture for controlling the hydrostatic unit in a transmission speed control mode. In this way, the differential pressure $p_{Diff}$ may be controlled by compensating the pump displacement in the torque control mode, or the pump displacement may be controlled by compensating the differential pressure $p_{Diff}$ in the speed control mode. This allows the HVT to efficiently switch between the speed and torque control modes, and minimize a discontinuity between the speed and torque control modes when switching. As a result, a performance of the vehicle during operation may be increased and a wear on parts of the transmission may be decreased. An additional advantage of the method is that the torque control mode and the speed control mode share a common model and a common procedure for calibration, which may reduce a use of computational resources and/or reduce a latency when switching between control modes.

The technical effect of using a common, non-linear multi-coefficient model and calibration procedure for controlling a hydrostatic unit where the differential pressure $p_{Diff}$ is controlled in a torque control mode and a pump displacement $\alpha_{pump}$ is controlled in a speed control mode is that an accuracy of a feedforward control model may be increased, an efficiency of switching between the speed and torque control modes may be maximized, and a discontinuity between the speed and torque control modes when switching may be reduced (e.g., avoided).

The disclosure also provides support for a control method for a hydrostatic unit of a hydromechanical variable transmission (HVT), comprising: controlling the hydrostatic unit via a feedforward control architecture including a non-linear, multi-coefficient model, wherein the hydrostatic unit comprises a hydrostatic pump and a hydrostatic motor. In a first example of the method, a displacement of the hydrostatic pump is controlled by an angle of a swash plate of the hydrostatic unit, the angle of the swash plate is controlled by a pump control piston of the hydrostatic unit, and an output of the feedforward control architecture is a change in pressure differential of a hydraulic fluid on two sides of a pump control piston. In a second example of the method, optionally including the first example, controlling the hydrostatic unit further comprises switching between operating the HVT in a torque control mode and operating the HVT in a speed control mode of the hydrostatic unit based on vehicle operating conditions, and the same non-linear, multi-coefficient model is used for both the torque control mode and the speed control mode. In a third example of the method, optionally including one or both of the first and second examples, the HVT is engaged in the torque control mode and the HVT is disengaged in the speed control mode. In a fourth example of the method, optionally including one or more or each of the first through third examples, the hydrostatic unit is operated in the speed control mode at a first engagement of a gear of the HVT, to synchronize a desired clutch of the HVT. In a fifth example of the method, optionally including one or more or each of the first through fourth examples, the hydrostatic unit is operated in the speed control mode during a freewheel condition to follow a free output speed of the HVT in preparation of a fast re-engagement of a clutch of the HVT. In a sixth example of the method, optionally including one or more or each of the first through fifth examples, operating the HVT in the torque control mode includes controlling a differential pressure of the hydrostatic pump by compensating a pump displacement of the hydrostatic pump, and operating the HVT in the speed control mode includes controlling the pump displacement by compensating the differential pressure. In a seventh example of the method, optionally including one or more or each of the first through sixth examples, during operation in the torque control mode, an input into the feedforward control architecture is a desired differential pressure, and during operation in the speed control mode, an input into the feedforward control architecture is a desired pump displacement. In an eighth example of the method, optionally including one or more or each of the first through seventh examples, the non-linear, multi-coefficient model has a plurality of coefficients that are calibrated at predetermined time intervals via an automatic calibration procedure that operates one or more clutches and the hydrostatic unit to determine the plurality of coefficients, the method further comprising controlling the pump control piston via the feedforward control architecture using the non-linear, multi-coefficient model with the calibrated coefficients. In a ninth example of the method, optionally including one or more or each of the first through eighth examples, one or more inputs to the feedforward control architecture include junction filters to reduce a discontinuity when switching between the torque control mode and the speed control mode. In a tenth example of the method, optionally including one or more or each of the first through ninth examples, the automatic calibration procedure includes: solving for the four coefficients at a plurality of engine speeds, identifying a trend in each coefficient of the four coefficients over the plurality of engine speeds, and calibrating each coefficient of the four coefficients based on the trend of each coefficient.

The disclosure also provides support for a control system for a hydromechanical variable transmission (HVT) of a vehicle, comprising: a hydrostatic unit including a hydrostatic pump and a hydrostatic motor rotationally coupled in parallel with a planetary gear set, a controller including a processor and instructions stored on a non-transitory memory of the controller that when executed cause the controller to: in response to a request to control a torque of the hydrostatic motor, implement a first feedforward control architecture including a non-linear, multi-coefficient model, where inputs into the non-linear, multi-coefficient model include a desired differential pressure of the hydrostatic pump, a measured differential pressure of the hydrostatic pump, and an estimated displacement of the hydrostatic pump, in response to a request to control a speed of the hydrostatic motor, implement a second feedforward control architecture including the non-linear, multi-coefficient model, where inputs into the non-linear, multi-coefficient model include a desired displacement of the hydrostatic pump, a measured differential pressure of the hydrostatic pump, and an estimated displacement of the hydrostatic pump, and adjust a position of a pump control piston of the hydrostatic unit based on an output of the non-linear, multi-coefficient model, where the output is a desired differential pressure of a hydraulic fluid on two sides of the pump control piston. In a first example of the system, the request to control the torque of the hydrostatic motor is in response to an engagement of a gear of the HVT, and the request to control the speed of the hydrostatic motor is in response to a disengagement of a gear of the HVT. In a second example of the system, optionally including the first example, the first feedforward control architecture and the second feedforward control architecture include junction filters for the inputs of the non-linear, multi-coefficient model. In a third example of the system, optionally including one or both of the first and second examples, an integral term of the first feedforward control architecture or the second feedforward control architecture is reset to a last output value when switching between a speed control mode and a torque control mode. In a fourth example of the system, optionally including one or more or each of the first through third examples, the non-linear, multi-coefficient model implements a polynomial non-linear equation with four coefficients based on the Newton-Euler formula. In a fifth example of the system, optionally including one or more or each of the first through fourth examples, the four coefficients are calibrated by an automatic calibration procedure including: reducing a differential pressure of the hydrostatic unit to zero to solve for a fourth coefficient of the four coefficients, knowing the fourth coefficient, increasing the differential pressure to solve for a first coefficient and a second coefficient of the four coefficients, knowing the fourth coefficient, the first coefficient and the second coefficient, decreasing the differential pressure to solve for a third coefficient of the four coefficients. In a sixth example of the system, optionally including one or more or each of the first through fifth examples comprising further instructions stored in memory that when executed, cause the controller to: disengage clutches of the planetary gear set to reduce the reduce the differential pressure to zero, engage clutches of the planetary gear set and operate the hydrostatic unit in a pump mode to increase the differential pressure, and engage clutches of the planetary gear set and operate the hydrostatic unit in a motor mode to decrease the differential pressure. In a seventh example of the system, optionally including one or more or each of the first through sixth examples comprising further instructions stored in memory that when executed, cause the controller to: solve for the four coefficients at a plurality of engine speeds, and based on a trend in each coefficient of the four coefficients over the plurality of engine speeds, calibrate each coefficient based on the trend of each coefficient.

The disclosure also provides support for a control method for a hydrostatic unit of a hydromechanical variable transmission (HVT) of a vehicle, comprising: in a first mode of operation, using a first feedforward control architecture including a non-linear, multi-coefficient model to adjust a pressure of a hydraulic fluid on a pump control piston of the hydrostatic unit following a torque reference, and in a second mode of operation, using a second feedforward control architecture including the non-linear, multi-coefficient model to adjust a pressure of a hydraulic fluid on a pump control piston of the hydrostatic unit following a speed reference, wherein the hydrostatic unit switches between the first mode of operation and the second mode of operation dynamically based on input from an operator of the vehicle.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the term "substantially" is construed to mean plus or minus five percent of the range, unless otherwise specified.

The invention claimed is:

1. A method for operation of a hydromechanical variable transmission (HVT) system, comprising:
    operating a hydrostatic unit in a torque control mode based on vehicle operating conditions and via a feedforward control architecture that includes a model;
    wherein the hydrostatic unit comprises a hydrostatic pump that is hydraulically coupled to a hydrostatic motor;
    wherein the hydrostatic unit is rotationally coupled to a planetary gear set, and
    wherein the feedforward control architecture uses one or more junction filters.

2. The method of claim 1, wherein the feedforward control architecture includes a non-linear model.

3. The method of claim 1, wherein the model is multi-coefficient model.

4. The method of claim 1, further comprising operating the hydrostatic unit in a speed control mode based on vehicle operating conditions and via the feedforward control architecture.

5. The method of claim 4, further comprising switching between the torque control mode and the speed control mode.

6. The method of claim 1, wherein the feedforward control architecture uses a displacement error of the hydrostatic unit.

7. The method of claim 1, wherein the model is derived based on a Newton-Euler formula.

8. A method for operation of a hydromechanical variable transmission (HVT) system, comprising:
    switching a hydrostatic unit in a torque control mode and a speed control mode;
    wherein in the speed control mode and the torque control mode, the hydrostatic unit is controlled based on vehicle operating conditions and via a feedforward control architecture that includes a model;
    wherein the hydrostatic unit comprises a hydrostatic pump that is hydraulically coupled to a hydrostatic motor;
    wherein the hydrostatic unit is rotationally coupled in parallel with a planetary gear set; and
    wherein the feedforward control architecture uses one or more junction filters.

9. The method of claim 8, wherein the model is a non-linear, multi-coefficient model.

10. The method of claim 8, further comprising automatically shifting between a forward drive mode and a reverse drive mode.

11. The method of claim 8, wherein the feedforward control architecture uses a displacement error of the hydrostatic unit.

12. The method of claim 8, wherein inputs into the model include a desired differential pressure of the hydrostatic pump, a measured differential pressure of the hydrostatic pump, and an estimated displacement of the hydrostatic pump.

* * * * *